United States Patent
Fujito (10) Patent No.: US 9,215,706 B2
(45) Date of Patent: Dec. 15, 2015

(54) RADIO COMMUNICATION SYSTEM, RADIO BASE STATION, AND COMMUNICATION CONTROL METHOD FOR INTERFERENCE REDUCTION

(75) Inventor: Kyoko Fujito, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 428 days.

(21) Appl. No.: 13/575,589

(22) PCT Filed: Jan. 27, 2011

(86) PCT No.: PCT/JP2011/051579
§ 371 (c)(1),
(2), (4) Date: Jul. 26, 2012

(87) PCT Pub. No.: WO2011/093370
PCT Pub. Date: Aug. 4, 2011

(65) Prior Publication Data
US 2012/0295546 A1 Nov. 22, 2012

(30) Foreign Application Priority Data
Jan. 27, 2010 (JP) .................................. 2010-015837

(51) Int. Cl.
*H04B 17/00* (2015.01)
*H04W 72/04* (2009.01)
(Continued)

(52) U.S. Cl.
CPC ........ *H04W 72/0426* (2013.01); *H04W 72/082* (2013.01); *H04W 92/20* (2013.01)

(58) Field of Classification Search
CPC .. H04B 7/0626; H04B 7/0632; H04B 1/7097; H04W 16/14

USPC ............................ 455/63.1, 39, 453; 370/317
See application file for complete search history.

(56) References Cited

U.S. PATENT DOCUMENTS 7,917,110 B2    3/2011  Horiguchi et al.
8,345,607 B2 *  1/2013  Banerjea ....................... 370/329
(Continued)

FOREIGN PATENT DOCUMENTS

JP      2007-300419 A   11/2007
WO    2006/087797 A1    8/2006
WO    2009/084463 A1    7/2009

OTHER PUBLICATIONS

An Office Action; "Notice of Reason for Rejection," issued by the Japanese Patent Office on Aug. 20, 2013, which corresponds to Japanese Patent Application No. 2010-015837 and is related to U.S. Appl. No. 13/575,589; with Statement of Relevance.
(Continued)

*Primary Examiner* — Nay A Maung
*Assistant Examiner* — Angelica M Perez
(74) *Attorney, Agent, or Firm* — Studebaker & Brackett PC (57) ABSTRACT

An LTE base station (10-1) incorporates an initiation time for the measurement of the amount of interference and a measurement duration, which act as time information relating to the timing of the occurrence of interference, into load information (LI) messages, which act as interference control information, and transmits the LI messages to another LTE base station. Meanwhile, when the LTE base station (10-1) receives LI messages from another LTE base station, of the received LI messages, only LI messages in which the corresponding measurement duration period overlaps with the validity period are aggregated, and on the basis of the aggregate result, interference reduction control is carried out.

7 Claims, 8 Drawing Sheets (51) Int. Cl.
　　　*H04W 72/08*　　(2009.01)
　　　*H04W 92/20*　　(2009.01)

(56) References Cited

U.S. PATENT DOCUMENTS

| | | | |
|---|---|---|---|
| 8,432,870 B2* | 4/2013 | Maheshwari et al. | 370/331 |
| 8,509,696 B2 | 8/2013 | Muraoka et al. | |
| 2007/0253394 A1 | 11/2007 | Horiguchi et al. | |
| 2007/0280170 A1* | 12/2007 | Kawasaki | 370/331 |
| 2009/0247084 A1* | 10/2009 | Palanki | 455/63.1 |
| 2010/0216497 A1 | 8/2010 | Kawasaki | |
| 2010/0279725 A1 | 11/2010 | Muraoka et al. | |

OTHER PUBLICATIONS

3GPP TS 36.423 V8.8.0 (Dec. 2009); 3rd Generation Partnership Project; Technical Specification Group Radio Access Network; Evolved Universal Terrestrial Radio Access Network (E-UTRAN); X2 application protocol(X2AP) (Release 8).

3GPP TS 36.300 V8.5.0(May 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 8).

International Search Report; PCT/JP2011/051579; Mar. 29, 2011.

* cited by examiner

| BASE STATION ID | MEASUREMENT START TIME | MEASUREMENT PERIOD |
|---|---|---|
| 001 | 11:58:01 | 60sec |
| 002 | 11:58:31 | 60sec |
| 003 | 11:59:01 | 50sec |

RADIO COMMUNICATION SYSTEM, RADIO BASE STATION, AND COMMUNICATION CONTROL METHOD FOR INTERFERENCE REDUCTION

TECHNICAL FIELD

The present invention relates to a radio communication system including a plurality of radio base stations and a network control device in an upper network and capable of establishing a first connection (a logical transmission path) among the radio base stations and a second connection (a logical transmission path) between the radio base station and the network control device, a radio base station in the radio communication system, a network control device in the radio communication system, and a communication control method in the radio communication system.

BACKGROUND ART

According to 3GPP (Third Generation Partnership Project), at the present time, a radio communication system employing LTE (Long Term Evolution) and the like, the standardization of which is under progress, requires both an S1 connection which is a logical transmission path between a radio base station (hereinafter, referred to as an "LTE base station") and a core network and an X2 connection which is a logical transmission path among radio base stations in order to achieve a quick handover, reduction of a processing load in the core network, and the like.

In order to establish the X2 connection, the LTE base station acquires information on other neighboring LTE base stations and holds a neighboring base station list (hereinafter, referred to as a "neighbor list") as a list of information on the other LTE base stations. The other neighboring LTE base stations indicate other LTE base stations located at a close distance from the LTE base station. The LTE base station holds the neighbor list, so that it is possible to achieve the establishment of the X2 connection, load distribution among the LTE base stations, and control of restriction and the like at the time of maintenance.

As a technique in which the LTE base station acquires the neighbor list, employing ANR (Automatic Neighbour Relation Function) is considered. According to the ANR, the LTE base station receives a measurement report, which is periodically transmitted from a radio terminal or which is transmitted at every time of an event, and obtains the neighbor list based on the measurement report (for example, refer to Non Patent Literature 1).

Furthermore, as a method in which the LTE base station selects other LTE base stations that can establish the X2 connection, based on the neighbor list obtained by the ANR, there is proposed a technique of updating a White List and a Black List as the neighbor list based on OAM (Operation and Maintenance) information. Here, the White List is a list including information on other LTE base stations, which are partners to which the X2 connection is to be actively established, and the Black List is a list including information on other LTE base stations that cannot establish the X2 connection.

Furthermore, as a technique in which the LTE base station performs ICIC (Inter-Cell Interference Coordination), a technique based on an LI (Load Information) message exchanged among LTE base stations is defined. The LI message includes OI (Overload Indicator), HII (High Interference Indicator), and RNTP (Relative Narrowband Tx Power) as interference control information for reducing interference.

PRIOR ART DOCUMENT

Patent Document

[NPL 1] "3GPP TS 36.300 V8.5.0 (2008-05)", [online], [search on Dec. 15, 2009], <URL: http://www.arib.or.jp/IMT-2000/V700Sep08/5_Appendix/Rel8/36/36300-850.pdf>

SUMMARY OF THE INVENTION

However, in the ICIC, when LI messages are exchanged among LTE base stations, transmission delay is likely to be increased due to a connection state. If the transmission delay of the LI messages is increased, when the LTE base station receives the LI messages from other LTE base stations, an interference state is likely to be significantly changed as compared with when the LI messages have been transmitted from the other LTE base stations. Therefore, although the LTE base station performs control for reducing interference based on the LI messages, the interference may not be appropriately reduced.

Therefore, the present invention has been achieved in view of the above-described problems, and an object thereof is to provide a radio communication system, a radio base station, a network control device, and a communication control method, by which it is possible to appropriately reduce interference.

To solve the above problems, the present invention includes the following features. A first feature of the present invention is summarized in that a radio communication system including a first radio base station and a second radio base station (LTE base stations 10-1, 10-2, and 10-3), the first radio base station includes: a transmission unit (an LI message transmission processing unit 154) configured to transmit interference control information to the second radio base station, the interference control information including time information used for reducing interference that indicates an interference occurrence time, and the second radio base station includes: a reception unit (an LI message reception processing unit 156) configured to receive the interference control information from the first radio base station.

In the radio communication system as described above, when the first radio base station transmits the interference control information to the second radio base station, the first radio base station allows the time information indicating the interference occurrence time to be included in the interference control information. Meanwhile, the second radio base station receives the interference control information, and can perform interference reduction control based on the interference control information, which indicates a time included in a time period in which the time information is regarded as valid, in the interference control information. Consequently, it is possible to appropriately perform the interference reduction control with taking transmission delay of the interference control information into consideration.

A second feature of the present invention is summarized as that the second radio base station comprises: an interference control unit (interference control unit 158) performs interference reduction control based on interference control information, which indicates a time included in a time period in which the time information is regarded as valid, among the interference control information received by the reception unit.

A third feature of the present invention is summarized as that the interference control unit performs weighting of the interference control information according to a degree of overlapping between a time zone indicated by the time information and a time zone regarded as valid.

A fourth feature of the present invention is summarized as that the interference control unit increases a value of the weighting of interference control information as the degree of overlapping is larger.

A fifth feature of the present invention is summarized as that the time information includes a measurement time zone indicating a time zone in which interference is measured in the first radio base station.

A sixth feature of the present invention is summarized as a radio base station constituting a radio communication system, comprising: a transmission unit configured to transmit interference control information to another radio base station, the interference control information including time information used for reducing interference that indicates an interference occurrence time.

A seventh feature of the present invention is summarized as a radio base station constituting a radio communication system, comprising: a reception unit configured to receive interference control information from another radio base station, the interference control information used for reducing interference that includes time information indicating an interference occurrence time.

An eighth feature of the present invention is summarized as the radio base station comprising: an interference control unit configured to perform interference reduction control based on the interference control information, which indicates a time included in a time period in which the time information is regarded as valid, among the interference control information received by the reception unit.

A ninth feature of the present invention is summarized as a communication control method in a radio communication system including a first radio base station and a second radio base station, the communication control method comprising: a step of transmitting interference control information, by the first radio base station, to the second radio base station, the interference control information used for reducing that includes time information indicating an interference occurrence time, and a step of receiving the interference control information, by the second radio base station, from the first radio base station.

A tenth feature of the present invention is summarized as the communication control method comprising: a step of performing interference reduction control, by the second radio base station, based on interference control information, which indicates a time included in a time period in which the time information is regarded as valid, among the received interference control information.

According to the present invention, it is possible to appropriately reduce interference.

MODES FOR CARRYING OUT THE INVENTION

Next, an embodiment of the present invention will be described with reference to the drawings. Specifically, (1) Schematic Configuration of Radio Communication System, (2) Configuration of LTE Base Station, (3) Configuration of MME, (4) Operation of LTE Base Station, (5) Operation and Effect, and (6) Other Embodiments will be described. It is to be noted that the same or similar reference numerals are applied to the same or similar parts through the drawings in the following embodiments.

(1) Schematic Configuration of Radio Communication System

Figure 1:
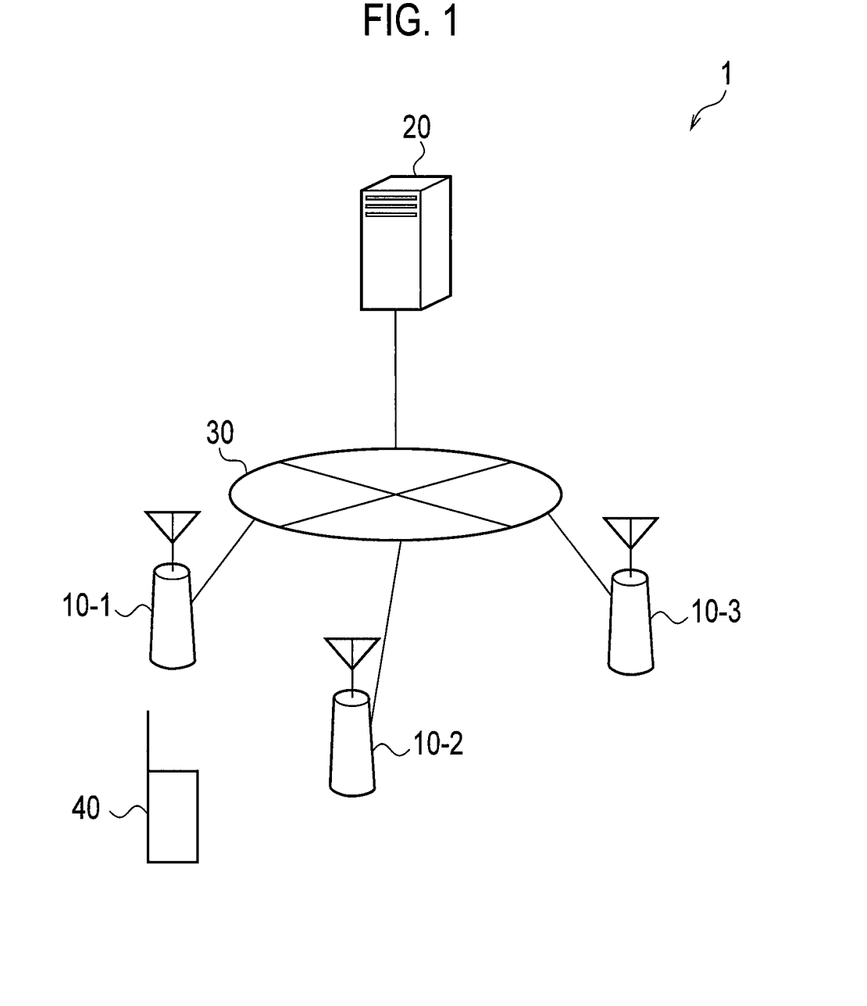
FIG. 1 is a diagram showing the entire schematic configuration of a radio communication system according to an embodiment of the present invention.

FIG. 1 is a diagram showing the schematic configuration of a radio communication system according to the present embodiment. In the present embodiment, a radio communication system 1 is configured using an LTE technology. In the radio communication system 1 as shown in FIG. 1 includes LTE base stations 10-1, 10-2, and 10-3 serving as radio base stations, MME (Mobile Management Entity) 20 serving as a network control device, a backbone network 30 serving as an upper network, and a radio terminal 40.

The LTE base stations 10-1 to 10-3 perform radio communication with the radio terminal 40 via a radio communication interval. In LTE, a communication scheme between the LTE base stations 10-1 to 10-3 and the radio terminal 40 is called E-UTRAN (Evolved UMTS Terrestrial Radio Access Network).

(2) Configuration of LTE Base Station

Figure 2:
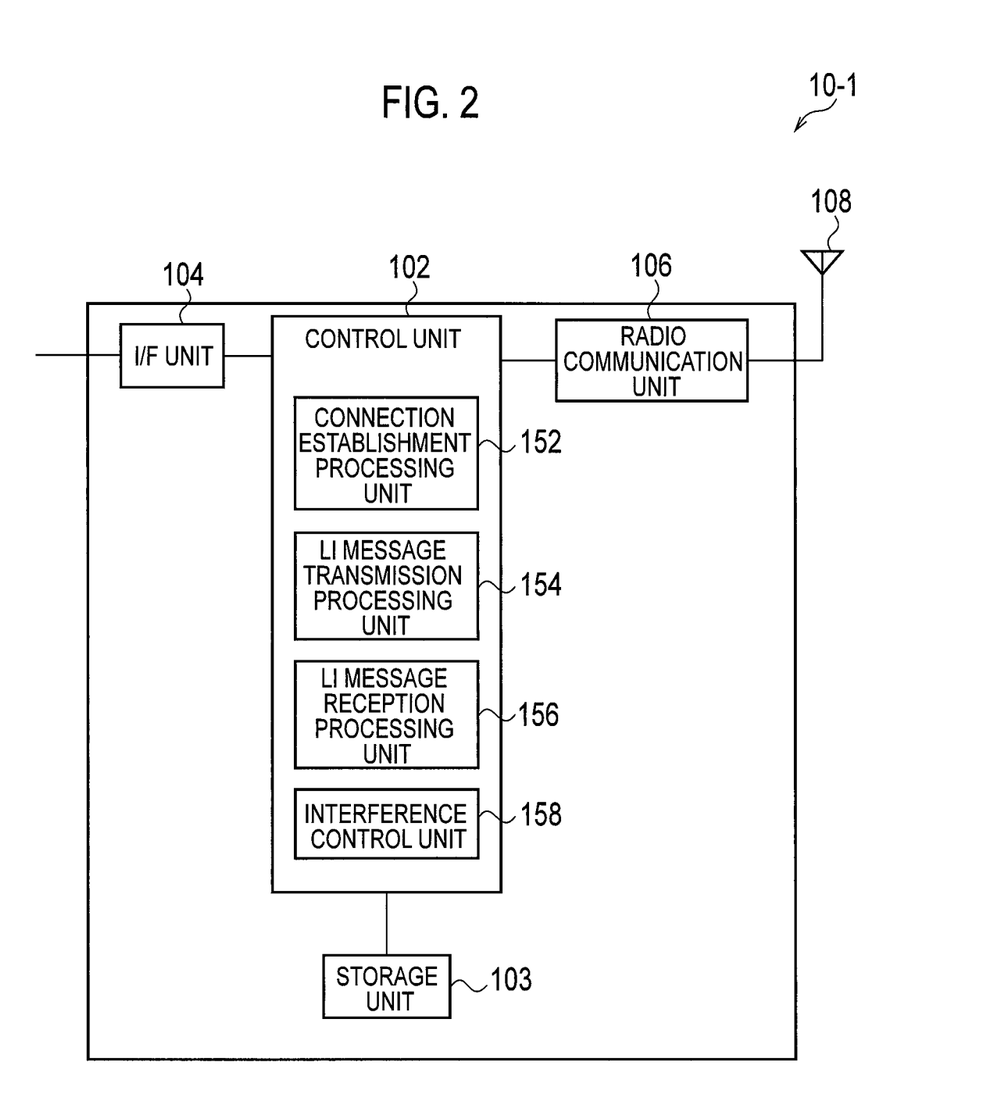
FIG. 2 is a configuration diagram of an LTE base station according to the embodiment of the present invention.

FIG. 2 is a diagram showing the configuration of the LTE base station 10-1. The LTE base station 10-1 shown in FIG. 2 includes a control unit 102, a storage unit 103, an I/F unit 104, a radio communication unit 106, and an antenna 108. In addition, the LTE base stations 10-2 and 10-3 also have the same configuration as that of the LTE base station 10-1.

The control unit 102, for example, is configured by CPU, and controls various functions of the LTE base station 10-1. The storage unit 103, for example, is configured by a memory, and stores various types of information used in control and the like in the LTE base station 10-1.

The I/F unit 104 is connected to the backbone network 30. The radio communication unit 106 includes an RF circuit, a baseband circuit and the like, performs modulation, demodulation, encoding, decoding and the like, and transmits and receives a radio signal to/from the radio terminal 40 through the antenna 108.

The control unit 102 includes a connection establishment processing unit 152, an LI (Load Information) message transmission processing unit 154, an LI message reception processing unit 156, and an interference control unit 158.

(Process when LTE Base Station is Newly Installed)

Hereinafter, a description will be provided for a process when the LTE base station 10-1 is newly installed.

If the LTE base station 10-1 is powered on, the control unit 102 performs a starting process of the LTE base station 10-1, and initializes a radio interval for performing communication with the radio terminal 40 and a wired interval (a backhaul part) for performing communication with the MME 20. In the initialization of the backhaul part, the connection establishment processing unit 152 in the control unit 102 establishes an S1 connection, which is a logical transmission path of a transport layer, between the LTE base station 10-1 and the MME 20 through the backbone network 30.

Figure 3:
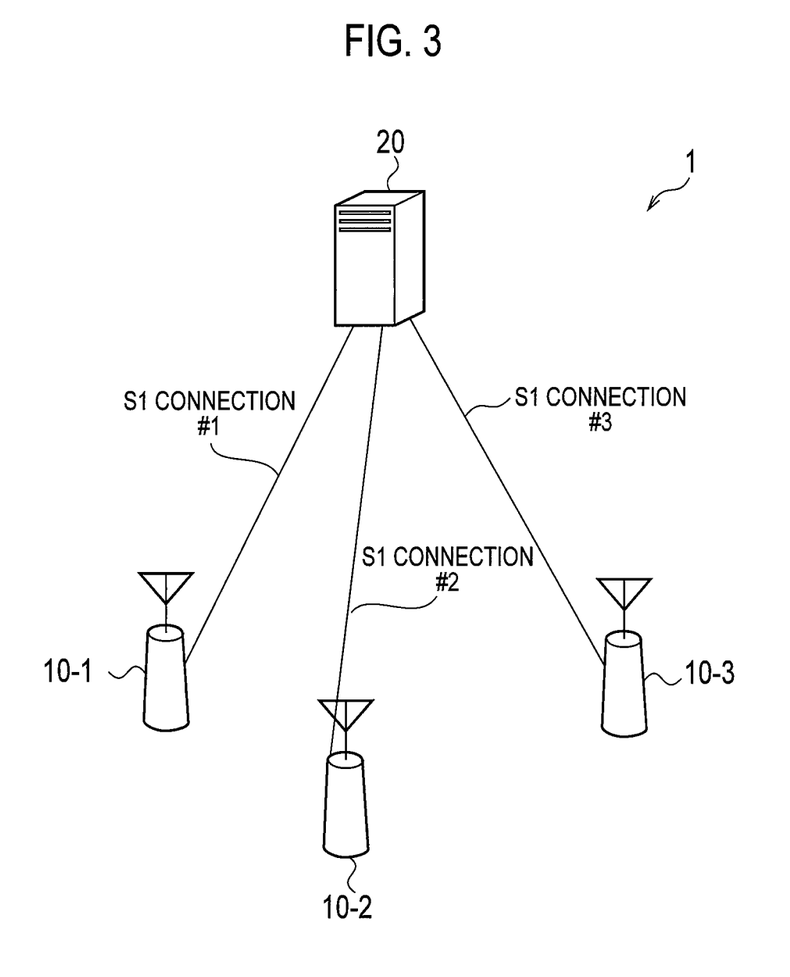
FIG. 3 is a diagram showing an establishment state of an S1 connection in the radio communication system according to the embodiment of the present invention.

FIG. 3 is a diagram showing an establishment state of an S1 connection in an initial state in the radio communication system 1. In FIG. 3, an S1 connection #1 is established between the LTE base station 10-1 and the MME 20. Furthermore, an S1 connection #2 is established between the LTE base station 10-2 and the MME 20, and an S1 connection #3 is established between the LTE base station 10-3 and the MME 20.

In the aforementioned initialization, the LTE base station 10-1 is transitioned to a state (an operation state) in which the LTE base station 10-1 can transmit and receive a radio signal to/from the radio terminal 40.

After the LTE base station 10-1 is transitioned to the operation state, the connection establishment processing unit 152 receives a measurement report, which is periodically transmitted from the radio terminal 40 connected to the LTE base station 10-1 or which is transmitted at every time of an event, through the antenna 108 and the radio communication unit 106 based on an ANR (Automatic Neighbour Relation Function) method. Moreover, the connection establishment processing unit 152 generates a neighbor list based on the received measurement report, and stores the neighbor list in the storage unit 103. In addition, the neighbor list may be stored in the storage unit 103 in advance.

Then, the connection establishment processing unit 152 updates a White List and a Black List as the neighbor list based on OAM (Operation and Maintenance) information. Here, the White List includes information on other LTE base stations to which the X2 connection with the LTE base station 10-1 is to be established.

Furthermore, the LI message transmission processing unit 154 measures an interference amount received by the LTE base station 10-1 in each resource block serving as a radio resource through communication between another LTE base station (here, the LTE base station 10-2 or the LTE base station 10-3) and a radio terminal connected to the other LTE base station. Here, the interference amount, for example, includes RSSI (Received Signal Strength Indicator).

Next, the LI message transmission processing unit 154 generates and transmits an LI message in each resource block.

Specifically, the LI message transmission processing unit 154 allows at least one of OI (Overload Indicator), HII (High Interference Indicator), and RNTP (Relative Narrowband Tx Power) to be included in an LI message, which corresponds to interference control information for reducing interference by ICIC (Inter-Cell Interference Coordination), as each IE (Information Element) in the message.

Here, the OI is interference control information for controlling uplink interference, and indicates an interference amount of a corresponding resource block in an LTE base station serving as a transmission source. The HII is the interference control information for controlling the uplink interference, and indicates a resource block to be assigned from the LTE base station serving as a transmission source to a radio terminal which exists at an edge of a cell formed by the LTE base station. The RNTP indicates transmission power of the corresponding resource block in the LTE base station serving as a transmission source.

Furthermore, the LI message transmission processing unit 154 allows a measurement start time and a measurement period (for example, 60 seconds) of the interference amount to be included in the LI message as time information regarding an interference occurrence time. Furthermore, the LI message transmission processing unit 154 allows identification information (cell IDs) of other LTE base stations included in the White List to be included in the LI message as destination information. Furthermore, the LI message transmission processing unit 154 allows identification information (cell ID) of the LTE base station 10-1 to be included in the LI message as transmission source information.

Moreover, the LI message transmission processing unit 154 periodically transmits the LI message after the LTE base station 10-1 is activated. In this case, when the X2 connection is not established between the LTE base station 10-1 and other LTE base stations at the transmission timing of the LI message, the LI message transmission processing unit 154 transmits the LI message to the MME 20 through the I/F unit 104 and the S1 connection.

Furthermore, when the X2 connection is not established between the LTE base station 10-1 and other LTE base stations, the following is performed.

The connection establishment processing unit 152 determines another LTE base station, which corresponds to information on other LTE base stations included in the White List, as a candidate (a connection candidate) for which the X2 connection with the LTE base station 10-1 is to be established. The other LTE base station serving as the connection candidate, for example, includes an LTE base station existing in a predetermined distance from the LTE base station 10-1, in other words, an LTE base station affected by the influence of interference each other beyond a predetermined level between the LTE base station and the LTE base station 10-1.

Moreover, the connection establishment processing unit 152 sequentially establishes the X2 connection, which is a logical transmission path of a transport layer, between the LTE base station 10-1 and the other LTE base station serving as the connection candidate through the backbone network 30. After establishing the X2 connection, the connection establishment processing unit 152 deletes information on the other LTE base station, for which the X2 connection with the LTE base station 10-1 is established, from the White List as the neighbor list.

When the X2 connection is established between the LTE base station 10-1 and the other LTE base stations at the transmission timing of the LI message, the LI message transmission processing unit 154 transmits the LI message to the another LTE base station, for which the X2 connection with the LTE base station 10-1 is established, through the I/F unit 104 and the X2 connection. At this time, the LI message transmission processing unit 154 also continuously transmits the LI message to the MME 20 through the S1 connection.

In this way, the X2 connection is sequentially established between the LTE base station 10-1 and the other LTE base station serving as the connection candidate, resulting in a gradual increase in the number of the other LTE base stations that receive the LI message from the LTE base station 10-1 through the X2 connection.

Figure 4:
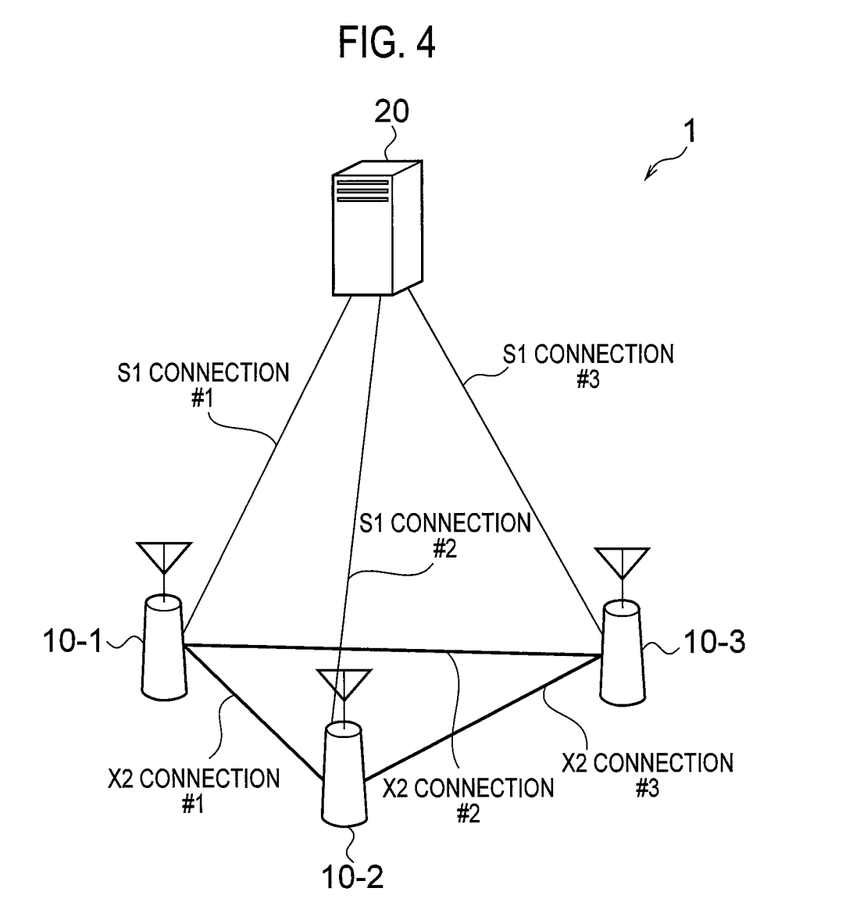
FIG. 4 is a diagram showing an establishment state of an X2 connection in the radio communication system according to the embodiment of the present invention.

FIG. 4 is a diagram showing an establishment state of the X2 connection in the radio communication system 1. When each of the LTE base stations 10-1, 10-2, and 10-3 employ another LTE base station of the two other than itself one another as a connection candidate, an X2 connection #1 is established between the LTE base station 10-1 and the LTE base station 10-2 as shown in FIG. 4. Furthermore, an X2 connection #2 is established between the LTE base station 10-1 and the LTE base station 10-3. Moreover, an X2 connection #3 is established between the LTE base station 10-2 and the LTE base station 10-3.

Then, the LI message transmission processing unit 154 determines whether the X2 connection is established between all other LTE base stations serving as the connection candidate and the LTE base station 10-1. Specifically, when information on the other LTE base stations is included in the White List as the neighbor list, the LI message transmission processing unit 154 determines that the X2 connection is not established between all the other LTE base stations serving as the connection candidate and the LTE base station 10-1. When the information on the other LTE base stations is not included in the White List as the neighbor list, the LI message transmission processing unit 154 determines that the X2 connection is established between all the other LTE base stations serving as the connection candidate and the LTE base station 10-1.

When the X2 connection is established between all the other LTE base stations serving as the connection candidate and the LTE base station 10-1, the LI message transmission processing unit 154 stops the transmission of the LI message to the MME 20 through the S1 connection.

(Normal-Time Process of LTE Base Station)

Hereinafter, a normal-time process of the LTE base station 10-1 will be described.

While the LTE base station 10-1 is performing a normal-time process, the LI message transmission processing unit 154 in the control unit 102 determines whether the X2 connection has been cut off or reset. For example, when a message different from the LI message is transmitted to another LTE base station through the I/F unit 104 and the X2 connection and then a response message is not received from the other LTE base station in a predetermined time, the LI message transmission processing unit 154 determines the X2 connection has been cut off or reset. In addition, determination regarding whether the X2 connection has been cut off or reset may be performed in communication confirmation at an SCTP (Stream Control Transmission Protocol) level.

When the X2 connection has been cut off or reset, the LI message transmission processing unit 154 allows information on the other LTE base station, which is a connection partner of the cut or reset X2 connection, to be included in the LI message as destination information. Moreover, the LI message transmission processing unit 154 transmits the LI message to the MME 20 through the I/F unit 104 and the S1 connection.

Then, the connection establishment processing unit 152 re-establishes the cut or reset X2 connection. If the re-establishment of the X2 connection is completed, the LI message transmission processing unit 154 transmits the LI message to the other LTE base station through the I/F unit 104 and the re-established X2 connection.

Then, the LI message transmission processing unit 154 determines whether all cut or reset X2 connections have been re-established.

When all the cut or reset X2 connections have been re-established, the LI message transmission processing unit 154 stops the transmission of the LI message to the MME 20 through the S1 connection.

(Process when LI Message is Received)

Hereinafter, a process of the LTE base station 10-1 when the LI message is received will be described.

While the LTE base station 10-1 is performing a normal-time process, the LI message reception processing unit 156 in the control unit 102 receives an LI message from the MME 20 through the S1 connection and the I/F unit 104. Furthermore, the LI message transmission processing unit 154 receives LI messages from other LTE base stations through the X2 connection and the I/F unit 104. The received LI messages are stored in the storage unit 103.

The interference control unit 158 determines whether a totaling timing of the LI messages has reached. The totaling timing of the LI messages, for example, is every 00 minutes on the hour, and information on the totaling timing is stored in the storage unit 103.

If the totaling timing of the LI messages is reached, the interference control unit 158 calculates a measurement time zone based on a measurement start time and a measurement period included in each LI message received up to the totaling timing and stored in the storage unit 103. Here, the beginning of the measurement time zone is the measurement start time, and the end of the measurement time zone is a time obtained by adding the measurement period to the measurement start time.

Next, the interference control unit 158 extracts LI messages, in which a corresponding measurement time zone overlaps a valid period, among the LI messages stored in the storage unit 103. The valid period is a past predetermined period (for example, for one minute) going back from the totaling timing of the LI messages, and is stored in the storage unit 103. Here, the interference control unit 158 also extracts an LI message in which a part of the corresponding measurement time zone is included in the valid period, as well as an LI message in which the whole of the corresponding measurement time zone is included in the valid period.

Next, the interference control unit 158 totals the extracted LI messages. Since the LI messages are generated in each resource block, the interference control unit 158 totals corresponding LI messages in each resource block.

Specifically, the interference control unit 158 calculates at least one of an average value of the OI included in each LI message, a use rate of resource blocks based on the HII, and an average value of the RNTP. Here, the extracted LI messages include an LI message in which the whole of a corresponding measurement time zone is included in the valid period and an LI message in which a part of the corresponding measurement time zone is included in the valid period. In this regard, the interference control unit 158 calculates an average value through weighted average based on weighting according to the degree of overlapping between the measurement time zone and the valid period.

Figure 5:
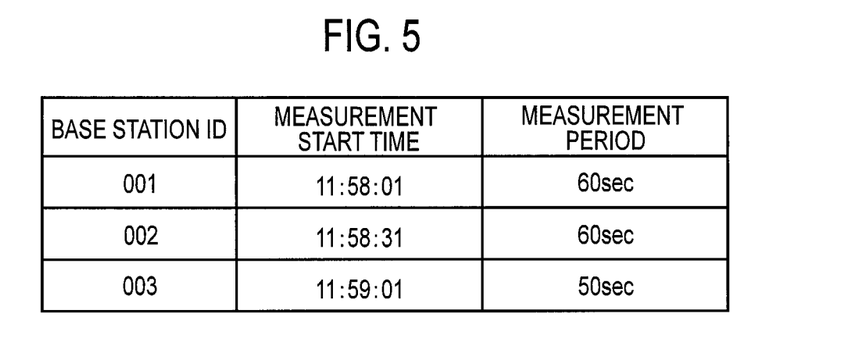
FIG. 5 is a diagram showing an example of a measurement start time and a measurement period according to the embodiment of the present invention.

FIG. 5 is a diagram showing an example of the measurement start time and the measurement period. Here, it is assumed that the valid period is 60 seconds going back from 12:00:00, that is, 11:59:01 to 12:00:00.

In this case, since a measurement time zone corresponding to base station ID 001 is 11:58:01 to 11:59:00, the measurement time zone does not overlap the valid period. Therefore, an LI message corresponding to the base station ID 001 is not an object to be extracted, and a weighting value of the LI message is 0.

Furthermore, since a measurement time zone corresponding to base station ID 002 is 11:58:31 to 11:59:30, ½ of the measurement time zone overlaps the valid period. Therefore, a weighting value of an LI message corresponding to the base station ID 002 is ½.

Furthermore, since a measurement time zone corresponding to base station ID 003 is 11:59:01 to 11:59:50, the whole of the measurement time zone overlaps the valid period. Therefore, a weighting value of an LI message corresponding to the base station ID 002 is 1.

In this way, after totaling at least one of the OI, the HII, and the RNTP in the LI messages, the interference control unit 158 performs interference reduction control based on a result of the totaling. A method, in which the interference control unit 158 performs the interference reduction control based on the OI, the HII, and the RNTP, is not specifically defined in the LTE standardization. However, for example, the interference control unit 158 may perform the interference reduction control as follows.

When the average value of the OI is equal to or more than a predetermined value, the interference control unit 158 sets scheduling policy with taking the OI into consideration. When the average value of the OI is smaller than the predetermined value, the interference control unit 158 sets the scheduling policy without considering the OI.

Furthermore, when the use rate of a resource block based on the HII is equal to or more than a predetermined value, the interference control unit 158 prevents the resource block from being assigned to a radio terminal (a cell edge terminal) which exists at an edge of a cell formed by the LTE base station 10-1.

Furthermore, when the average value of the RNTP is smaller than a predetermined value, the interference control unit 158 allows a corresponding resource block to be assigned. When the average value of the RNTP is equal to or more than the predetermined value, the interference control unit 158 prevents the corresponding resource block from being assigned.

(3) Configuration of MME

Figure 6:
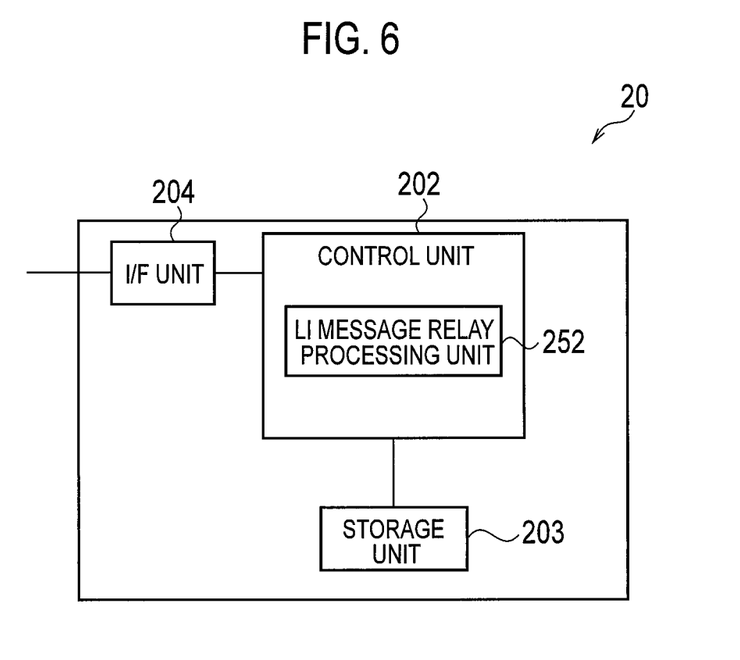
FIG. 6 is a configuration diagram of MME according to the embodiment of the present invention.

FIG. 6 is a diagram showing the configuration of the MME 20. The MME 20 shown in FIG. 6 includes a control unit 202, a storage unit 203, and an I/F unit 204.

The control unit 202, for example, is configured by CPU, and controls various functions of the LTE base station 10-1. The storage unit 203, for example, is configured by a memory, and stores various types of information used in control and the like in the MME 20. The I/F unit 204 is connected to the backbone network 30.

The control unit 202 includes an LI (Load Information) message relay processing unit 252.

The LI message relay processing unit 252 receives LI messages from the LTE base stations 10-1 to 10-3 through the S1 connection and the I/F unit 204. Next, the LI message relay processing unit 252 specifies any one of the LTE base stations 10-1 to 10-3, which serves as a destination of the LI message, based on destination information in the received LI messages. Moreover, the LI message relay processing unit 252 transmits the LI message to the specified one of the LTE base stations 10-1 to 10-3 through the X2 connection established between the I/F unit 204 and the specified one of the LTE base stations 10-1 to 10-3.

(4) Operation of LTE Base Station

Next, the operation of the LTE base station 10-1 will be described. In addition, the LTE base stations 10-2 and 10-3 also perform the same operation as that of the LTE base station 10-1.

Figure 7:
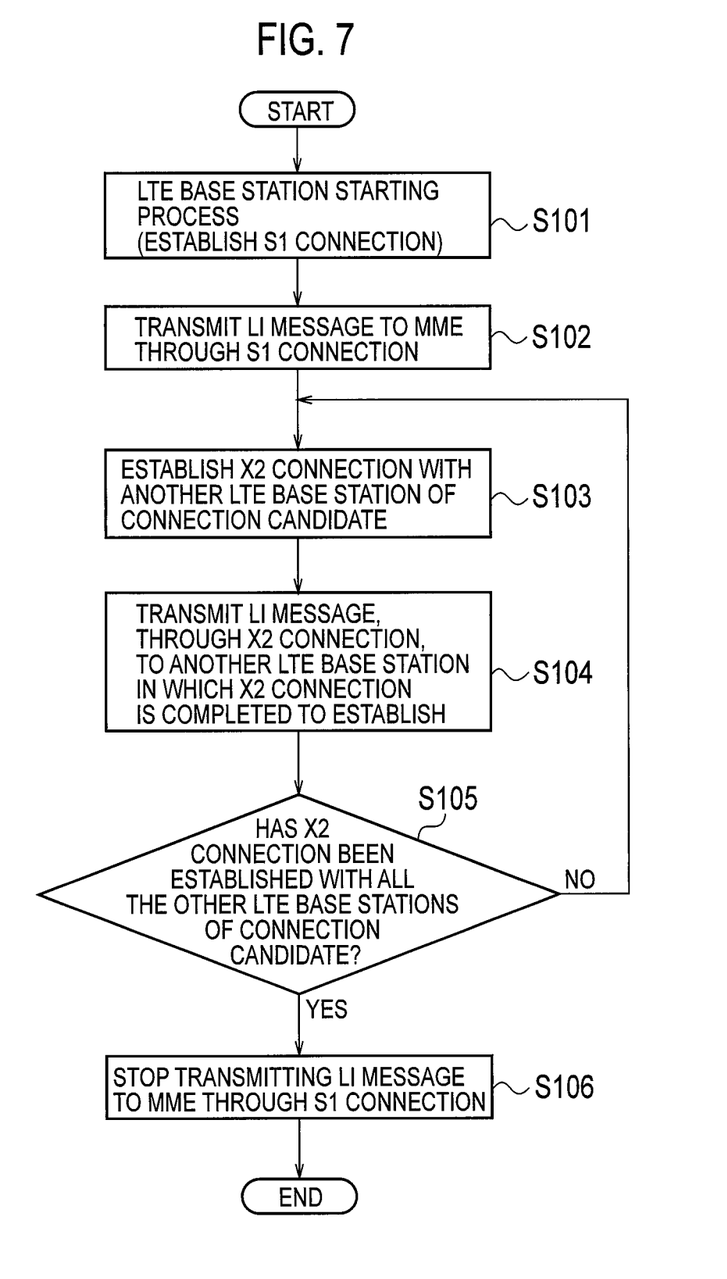
FIG. 7 is a flowchart showing an operation when the LTE base station is newly installed according to the embodiment of the present invention.

FIG. 7 is a flowchart showing an operation when the LTE base station 10-1 is newly installed.

In step S101, if the LTE base station 10-1 is powered on, the control unit 102 performs a starting process of the LTE base station 10-1, and establishes the S1 connection between the LTE base station 10-1 and the MME 20.

In step S102, the control unit 102 generates an LI message, and transmits the LI message to the MME 20 through the S1 connection. The MME 20 transmits the LI message received from the LTE base station 10-1 to another LTE base station through the S1 connection.

In step S103, the control unit 102 determines a candidate (a connection candidate) for which an X2 connection with the LTE base station 10-1 is to be established, and establishes the X2 connection between the LTE base station 10-1 and another LTE base station serving as the connection candidate.

In step S104, the control unit 102 generates an LI message, and transmits the LI message to the other LTE base station, for which the X2 connection with the LTE base station 10-1 is established in step S103, through the X2 connection.

In step S105, the control unit 102 determines whether the X2 connection is established between the LTE base station 10-1 and all other LTE base stations serving as the connection candidate.

When the X2 connection is not established between the LTE base station 10-1 and a part of the other LTE base stations serving as the connection candidate, the operation subsequent to the establishment of the X2 connection between the LTE base station 10-1 and the other LTE base stations serving as the connection candidate in step 103 is repeated.

Meanwhile, when the X2 connection is established between the LTE base station 10-1 and all the other LTE base stations serving as the connection candidate, the control unit 102 stops the transmission of the LI message to the MME 20 through the S1 connection in step S106.

Figure 8:
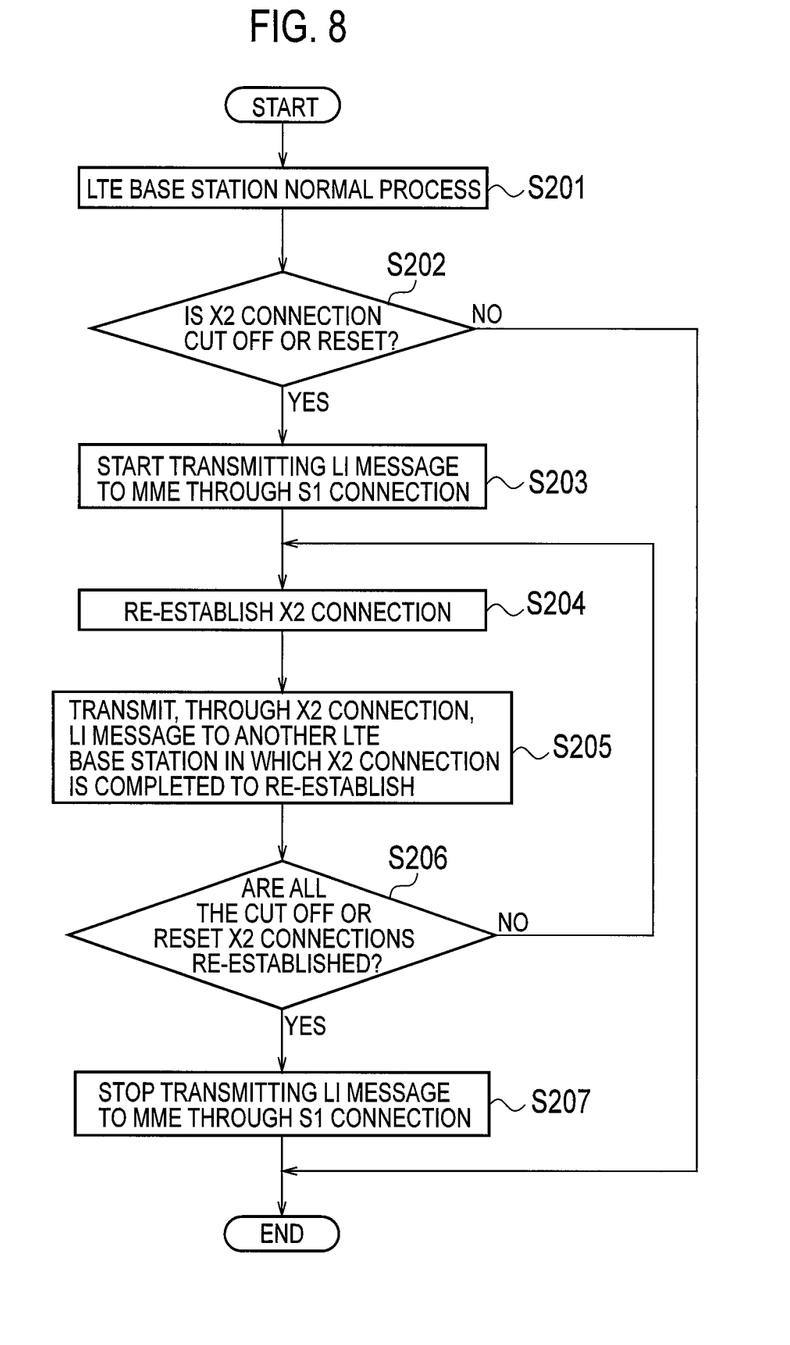
FIG. 8 is a flowchart showing a normal-time operation of the LTE base station according to the embodiment of the present invention.

FIG. 8 is a flowchart showing an operation of the LTE base station 10-1 at the normal process time.

While the LTE base station 10-1 is performing a normal-time process in step S201, the control unit 102 determines whether the X2 connection has been cut off or reset in step S202.

When the X2 connection has been cut off or reset, the control unit 102 transmits an LI message, which is addressed to another LTE base station serving as a connection partner of the cut or reset X2 connection, to the MME 20 through the S1 connection in step S203.

In step S204, the control unit 102 re-establishes the cut or reset X2 connection.

In step S205, the control unit 102 generates an LI message, and transmits the LI message to the other LTE base station, for which the X2 connection with the LTE base station 10-1 has been re-established, through the X2 connection.

In step S206, the control unit 102 determines whether all cut or reset X2 connections have been re-established.

When a part of the cut or reset X2 connections has not been re-established, the operation subsequent to the re-establishment of the X2 connection in step 203 is repeated.

Meanwhile, when all the cut or reset X2 connections has been re-established, the control unit 102 stops the transmission of the LI message to the MME 20 through the S1 connection in step S207.

Figure 9:
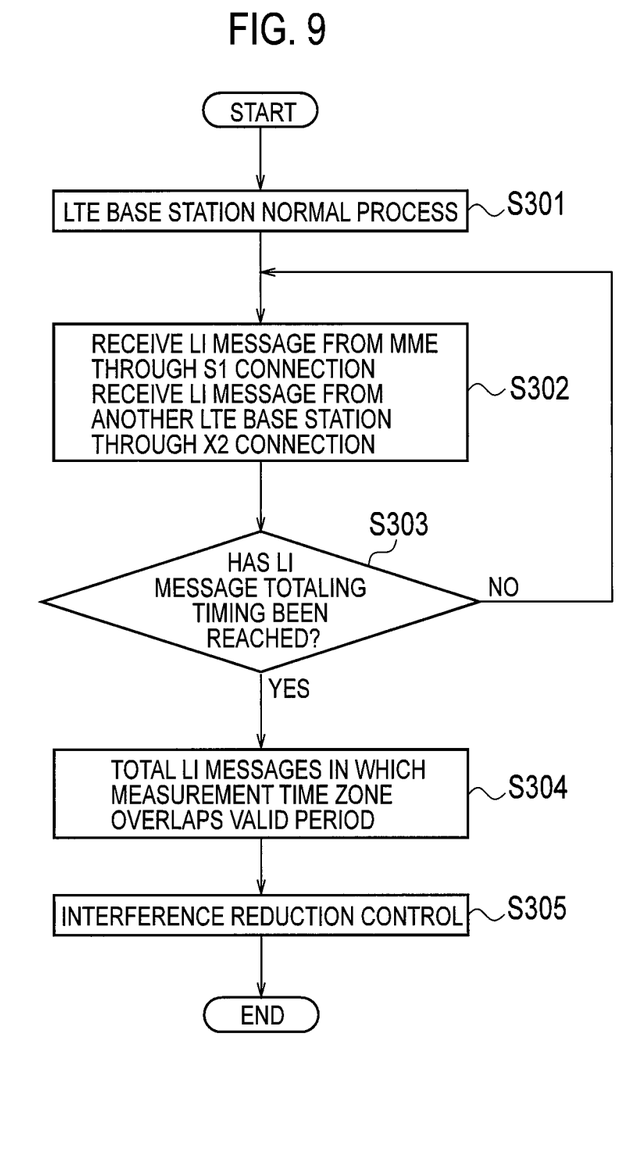
FIG. 9 is a flowchart showing an operation when the LTE base station receives an LI message according to the embodiment of the present invention.

FIG. 9 is a flowchart showing an operation when the LTE base station 10-1 receives an LI message.

While the LTE base station 10-1 is performing a normal-time process in step S301, the control unit 102 receives an LI message from the MME 20 through the S1 connection and also receives LI messages from other LTE base stations through the X2 connection in step S302.

In step S303, the control unit 102 determines whether a totaling timing of the LI messages has reached.

When the totaling timing of the LI messages has not reached, the operation subsequent to the reception of the LI messages in step S302 is repeated.

Meanwhile, when the totaling timing of the LI messages has reached, the control unit 102 totals LI messages in which a corresponding measurement time zone overlaps the valid period in step S304.

Moreover, in step S305, the control unit 102 performs interference reduction control based on a result obtained by totaling the LI messages.

(5) Operation and Effect

In this way, in the radio communication system 1 according to the embodiment of the present invention, the LTE base station 10-1 allows a measurement start time and a measurement period of an interference amount to be included in an LI message, which corresponds to interference control information, as time information regarding the interference occurrence time, and transmits the LI message to other LTE base stations.

Meanwhile, when LI messages are received from the other LTE base stations, the LTE base station 10-1 employs only LI messages, in which a corresponding measurement time zone overlaps the valid period, as objects to be totaled among the received LI messages, and performs interference reduction control based on a result obtained by totaling the LI messages. Consequently, it is possible to appropriately perform the interference reduction control based on an LI message with small transmission delay.

Particularly, the LTE base station 10-1 having received the LI message employs LI messages, in which a part of the corresponding measurement time zone is included in the valid period, as objects to be totaled as well as LI messages in which the whole of the corresponding measurement time zone is included in the valid period, and further totals the LI messages, in which a part of the corresponding measurement time zone overlaps the valid period, through weighting according to the degree of overlapping between the measurement time zone and the valid period. Consequently, it is possible to appropriately perform the interference reduction control having reflected an interference state in the valid period as much as possible.

(6) Other Embodiments

Thus, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

In the aforementioned embodiment, the LTE base station 10-1 allows a measurement start time and a measurement period of an interference amount to be included in an LI message as time information, and transmits the LI message. However, the time information is not limited thereto. For example, a transmission time or a generation time of the LI message may be used as the time information. In this case, an LTE base station having received the LI message employs only LI messages in which the transmission time or the generation time is in the valid period, as objects to be totaled, and performs the interference reduction control based on a result of the totaling.

In the aforementioned embodiment, when transmitting an LI message to the MME 20 through the S1 connection, the LI message transmission processing unit 154 of the control unit 102 of the LTE base station 10-1 allows information on another LTE base station serving as a destination to be included in the LI message, thereby specifying a transferring destination of the LI message in the MME 20.

However, the LI message transmission processing unit 154 may detect the position of the LTE base station 10-1 using a GPS function and the like, allow information on the detected position (for example, longitude and latitude information) to be included in the LI message, instead of the information on the another LTE base station serving as a destination, and transmit the LI message to the MME 20. In this case, the MME 20 determines another LTE base station in a predetermined distance from the LTE base station 10-1 as the transferring destination of the LI message received from the LTE base station 10-1, based on the position information of the LTE base station 10-1 included in the LI message received from the LTE base station 10-1, and position information of the other LTE base stations held in advance.

When the LTE base station 10-1 is newly set, since the MME 20 is considered not to hold the position information of the LTE base station 10-1, the LTE base station 10-1 transmits an LI message including the position information of the LTE base station 10-1, so that it is possible for the MME 20 to recognize the position of the LTE base station 10-1 and to appropriately determine a transferring destination of the LI message received from the LTE base station 10-1.

Furthermore, the LI message transmission processing unit 154 may acquire a transmission power value of the LTE base station 10-1, allow the acquired transmission power value to be included in an LI message, instead of the information on another LTE base station serving as a destination, and transmit the LI message to the MME 20. In this case, as the transmission power of the LTE base station 10-1 is larger, an interference range by the LTE base station 10-1 is expanded. In this regard, as the transmission power value included in the LI message from the LTE base station 10-1 is larger, the MME 20 expands an area about the LTE base station 10-1, and determines another LTE base station in the area as a transferring destination of the LI message from the LTE base station 10-1. As a result, it is possible to appropriately determine a transferring destination of the LI message in consideration of the interference range by the LTE base station 10-1.

Furthermore, in the aforementioned embodiment, the radio communication system 1 employing LTE has been described. However, the present invention can be applied to radio communication systems in the same manner if they are radio communication systems in which a logical transmission path is established among radio base stations.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-015837 (filed on Jan. 27, 2010) is incorporated in the present specification by reference.

INDUSTRIAL APPLICABILITY

According to a radio communication system, a radio base station, a network control device, and a communication control method of the present invention, it is possible to appropriately reduce interference, and it is available as a radio communication system and the like.

The invention claimed is:

1. A radio communication system including a first radio base station and a second radio base station, wherein
the first radio base station comprises:
a transmission unit configured to transmit interference control information to the second radio base station, the interference control information for reducing interference including time information indicating an interference occurrence time, and
the second radio base station comprises:
a reception unit configured to receive the interference control information from the first radio base station; and
an interference control unit configured to perform weighting of the interference control information according to a degree of overlapping between a time zone indicated by the time information and a time zone regarded as valid.

2. The radio communication system according to claim 1, wherein the interference control unit increases a value of the weighting of interference control information as the degree of overlapping increases.

3. The radio communication system according to claim 1, wherein the time information includes a measurement time zone indicating a time zone in which interference is measured in the first radio base station.

4. A radio base station constituting a radio communication system, comprising:
a reception unit configured to receive interference control information from another radio base station, the interference control information used for reducing interference that includes time information indicating an interference occurrence time; and
an interference control unit configured to perform weighting of the interference control information according to a degree of overlapping between a time zone indicated by the time information and a time zone regarded as valid.

5. The radio base station according to claim 4, wherein the interference control unit performs interference reduction control based on the interference control information, which indicates a time included in a time period in which the time information is regarded as valid, among the interference control information received by the reception unit.

6. A communication control method in a radio communication system including a first radio base station and a second radio base station, the communication control method comprising:
a step of transmitting interference control information, by the first radio base station, to the second radio base station, the interference control information used for reducing uplink interference and that a measurement start time and a measurement period of an uplink interference amount, and
a step of receiving the interference control information, by the second radio base station, from the first radio base station; and
a step of performing, by the second radio base station, weighting of the interference control information according to a degree of overlapping between a time zone indicated by the time information and a time zone regarded as valid.

7. The communication control method according to claim 6, comprising: a step of performing interference reduction control, by the second radio base station, based on the interference control information, which indicates a time included in a time period in which the time information is regarded as valid, among the received interference control information.

* * * * *